United States Patent [19]

Busse

[11] 4,259,981
[45] Apr. 7, 1981

[54] REMOVABLE INSULATED VALVE COVER

[76] Inventor: Richard O. Busse, 12863 Ingersoll, Hugo, Minn. 55038

[21] Appl. No.: 78,442

[22] Filed: Sep. 24, 1979

[51] Int. Cl.³ ............................................. F16L 59/16
[52] U.S. Cl. .................................... 137/375; 138/149; 285/47
[58] Field of Search ........................ 138/149; 137/375; 285/47, 156, 197

[56] References Cited

U.S. PATENT DOCUMENTS

| 388,260 | 8/1888 | Carey | 285/47 |
|---|---|---|---|
| 754,256 | 3/1904 | Sullivan | 285/47 |
| 926,423 | 6/1909 | Kelly | 285/47 |
| 1,108,840 | 8/1914 | Franke | 137/375 |
| 1,814,134 | 7/1931 | Eige | 285/47 |
| 2,041,911 | 5/1936 | Ericson | 138/149 |
| 2,778,405 | 6/1957 | Stephens et al. | 285/47 |
| 3,044,915 | 7/1962 | Jacobsen | 137/375 |
| 3,724,491 | 4/1973 | Knudsen et al. | 137/375 |
| 4,046,406 | 9/1977 | Press et al. | 137/375 |
| 4,112,967 | 9/1978 | Withem | 137/375 |
| 4,207,918 | 6/1980 | Burns et al. | 137/375 |

FOREIGN PATENT DOCUMENTS 579478  7/1959  Canada ...................................... 138/64

Primary Examiner—Martin P. Schwadron
Assistant Examiner—A. Michael Chambers
Attorney, Agent, or Firm—Merchant, Gould, Smith, Edell, Welter & Schmidt

[57] ABSTRACT

An insulated valve cover (2) for use on a non-cylindrical valve (4). Valve cover (2) comprises a plurality of parts (30, 32, and 34) which may be releasably secured together by encircling straps (62). The valve covers parts (30, 32, and 34) are shaped to fit around a given valve (4). Preferably, the valve cover parts (30, 32, and 34) are made from a high density substantially rigid fiberglass installation.

7 Claims, 4 Drawing Figures

REMOVABLE INSULATED VALVE COVER

TECHNICAL FIELD

This invention relates to an insulated valve cover for insulating steam pressure reducing valves, valve bonnets, valve flanges and the like. More generally, this invention relates to an insulated cover for insulating any component in a steam line or other similar installation having a non-cylindrical cross-section such that other conventional types of pipe insulation are not easily applied. Accordingly, this invention has application in many diverse areas in which heated valve stations are used.

DESCRIPTION OF THE PRIOR ART

Various industry groups, especially the utility industry or chemical process industry, utilize large expanses of piping to carry fluids or other materials at high temperatures. This is true also of the boiler rooms of power plants used to heat commercial buildings or to power a large ocean-going ship. Many of these pipe lines are steam lines carrying super-heated steam. As is true for all pipe line installations, valves are required at various spots along the pipe line. Some of these valves are simple control valves which simply stop the flow through the pipe. Other valves are more complex and when actuated divert the flow between one of a number of alternative lines.

The pipe lines themselves usually comprise cylindrical pipe sections suitably joined together end-to-end. Conventional valves are usually more complex geometrically than the pipe sections. For example, a valve usually comprises a valve body having a mounting flange at either end for connecting the valve into the pipe line. The mounting flanges are usually larger than the diameter of the pipe. In addition, the valve body usually has bell-shaped heads which extend above or below the valve for various purposes. These heads often enclose the operating parts of the valves or can contain temperature and humidity sensing controls for automatic operation of the valves. Moreover, a number of control lines also often enter the valve body.

The advantages of insulating a heated pipe line system, especially since the cost of energy has increased, is apparent. It has been conventional for many years to insulate the straight pipe sections of a pipe line installation with a relatively rigid high density, fiberglass insulation molded into cylindrical form. The Micro-Lok 650, Heavy Density Pipe Insulation, manufactured by Johns-Manville is one insulation of this type. Such insulation is prefabricated in sections and is made in cylindrical form having a longitudinal slit along one side. The insulation can be opened, placed around the pipe section and then closed to create a solid blanket of insulation extending around the circumference of the pipe. The insulation is usually covered by a jacket which can include a pressure sensitive tape closure system for binding the insulation section together along the longitudinal joint thereof. Adjacent sections of the insulation are placed on the pipe in an abutting end-to-end relationship.

While the purely cylindrical pipe sections in a pipe line easily lend themselves to being insulated, the more complex geometrical configuration of valves and other components in the piping installation make the insulating job more difficult with regard to them. It has thus been the practice in most industries to leave these components uninsulated. However, significant energy savings can be made if these components are insulated. One way of insulating such components would be to spray or encase the valve arrangement with a suitable asbestos or other insulating material. However, this is generally unsatisfactory since these valves often have seals or the like therein which fail. If an "integral" or encasement type of insulation is used, then the valve insulation would have to be stripped and replaced every time the valve has to be repaired. This would be both time-consuming and expensive not only because of the additional insulation which would be required but because of the amount of man hours needed to effect the change.

One type of insulation has been developed specifically for use in insulating valves in pipe line installations. This is a product which is known as the Petro-Saver system manufactured by HITCO Insulation Products. The Petro-Saver system comprise flexible and reusable insulated covers that can be wrapped and tied around steam valves and the like. These covers are a composite of various materials and typically are made up of fiberglass materials encapsulated between protective and moisture retardant covering. The HITCO Petro-Saver valve covers are reusable since they can be removed from a valve if the valve is to be repaired and then replaced on the valve after the repair.

While the HITCO Petro-Saver valve covers do not have the disadvantages of an encapsulated type of insulation, they nonetheless have certain disadvantages. For example, because the valve covers are a flexible blanket type material while the rest of the insulation in the piping system is customarily a rigid type of insulation, the blankets do not give a uniform look to the insulation and therefore somewhat detract from the appearance of the insulation. In addition, the Petro-Saver valve covers can be very difficult to install by one person especially when the valve is large or has a number of complex curves. For example, if the valve includes a number of bell shaped protrusions or the like, it is usually necessary for the blanket to be shaped around each of the protuberances and then tied in place. It is difficult, if not impossible, for one man to hold the flexible blanket in place around the protuberances and to also tie the blanket off. Accordingly, these blanket type materials often require two men for proper installation. This, of course, increases the labor costs required for installing these valve covers or for reinstalling them in the event that repair of the valve has been effected.

SUMMARY OF THE INVENTION

Accordingly, it is an aspect of the present invention to provide an insulated valve cover which can effectively insulate steam valves, valve bonnets and the like and which does not have the disadvantages of the prior art. Specifically, it is an aspect of the present invention to provide a prefabricated valve cover which one man can easily install or remove from a valve body.

The insulated valve cover of the present invention is designed particularly for insulating any components in a pipe line installation having a non-cylindrical configuration. More particularly, the insulated valve cover comprises a plurality of prefabricated and separate parts manufactured from a heavy density fiberglass insulation and covered with an outer protective jacket. Each of the parts of the valve cover are substantially rigid for easy handling. In addition, each of the parts of the valve cover are shaped to surround a portion of the component being insulated with all the parts collectively insulating the component as a whole. Releasable means are provided for holding the parts together in place around the component being insulated. Thus, the parts of the valve cover may be disassembled to allow easy access to the insulated component.

BRIEF DESCRIPTION OF THE DRAWINGS

The present invention will be described more particularly in the following Detailed Description, when taken in conjunction with the following drawings, in which like references numerals refer to like elements throughout.

DETAILED DESCRIPTION

Figure 2:
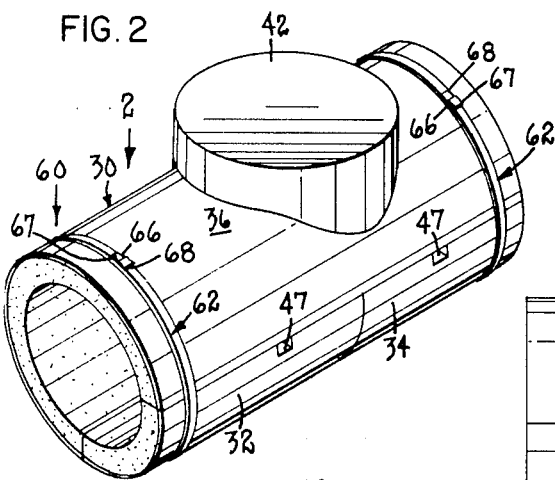
FIG. 2 is a perspective view of the insulated valve cover as shown in FIG. 1, particularly illustrating the parts of the valve cover in assembled form.
Figure 3:
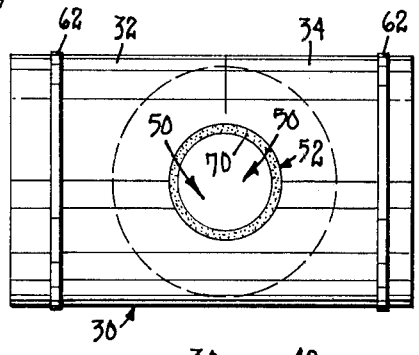
FIG. 3 is a bottom elevational view of the valve cover shown in FIG. 2.
Figure 4:
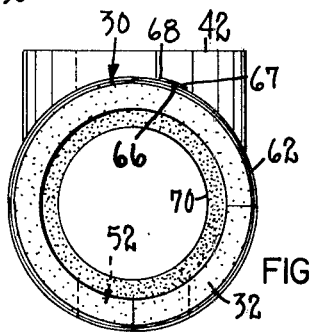
FIG. 4 is an end elevational view of the valve cover shown in FIG. 2.

Referring first to FIG. 2, an insulated cover according to the present invention is generally illustrated as 2. Cover 2 is usable in a pipe line installation for insulating any component thereof having a non-cylindrical crossectional configuration. Usually, such components comprise a steam valve, a gate valve, or other types of valves, but may also include valve bonnets, strainers, flanges, and the like. While cover 2 will be referred to as a valve cover and will be described for insulating a typical steam valve, cover 2 is not limited for use with valves.

Figure 1:
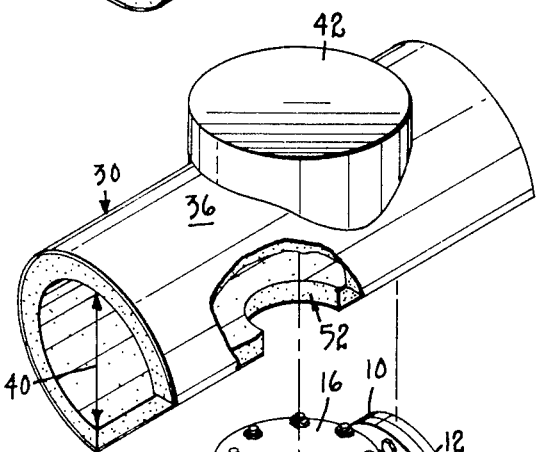
FIG. 1 is a perspective view of an improved insulated valve cover according to this invention, particularly illustrating the parts of the valve cover in an exploded form illustrating the manner in which the valve cover parts relate to one type of valve to which they are applied.
Figure 1:
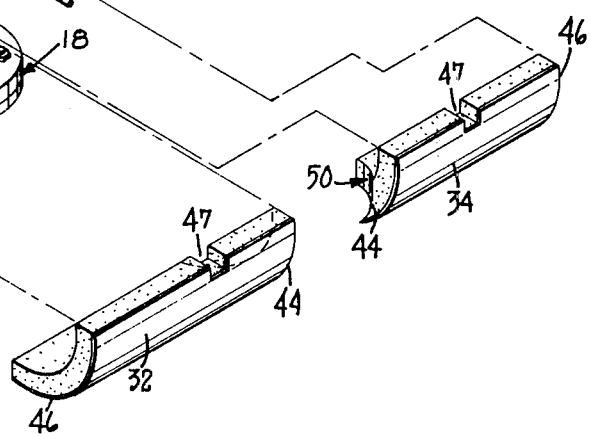

Referring now to FIG. 1, a typical Spence valve is generally illustrated as 4. Spence valve 4 relates to any steam valve which operates as a steam reducing station in any steam line. Valve 4 includes a generally cylindrical valve body 6 having substantially circular mounting flanges 8 and 10 at either end thereof. Flanges 8 and 10 may be coupled, using nut and bolt combinations 12, to similar flanges on adjacent pipe sections 14. In addition, valve body 6 includes upper and lower heads 16 and 18 which extend vertically from valve body 6. Heads 16 and 18 may be bell shaped having a generally horizontal and circular rim or flange 20 and an outwardly tapering body or stem 22 which connects flange 20 to valve body 6. Moreover, two longitudinal control lines 24 and 26 enter valve body 6 through the side thereof above lower head 18. Control lines 24 and 26 help to control the automatic operation of valve 4.

Valve 4 as described herein is typical of one type of valve often encountered in steam pipe lines. It is typical in the sense that it has various portions which make the valve non-cylindrical, i.e. the upper and lower heads 16 and 18, the flanges 8 and 10, the control lines 24 and 26. Lower head 18 of valve 4 contains temperature and/or humidity sensing controls which also control the operation of valve 4. As such, lower head 18 must never be insulated from the environment in which the steam pipe line is contained. However, upper head 16 contains no such controls and therefore may be insulated. Cover 2 will be described in conjunction with valve 4, but will apply equally well to any other type of component or valve as long as that valve has a non-cylindrical configuration, whether or not that valve includes any heads which should be kept exposed to the environment.

The Valve Cover

Valve cover 2 includes a plurality of separate parts which are releasably secured together. These parts include a main body section 30 and lower left and right body sections 32 and 34. All of the parts of valve cover 2 are preferably made from a substantially rigid high density fiberglass installation. One type of material which may be used for this purpose is the Micro-Lok 650 pipe insulation manufactured by Johns-Manville. Such insulation typically comprises a batt of insulating material faced on the exterior surface with an appropriate jacket or covering which may be either moisture or fire retardant. In the present invention, it has been found that the covering for such insulation can comprise a canvas type of material which is suitably treated or coated such that the exterior surface of valve cover 2 has a finished appearance. Any other suitable coverings or types of insulating materials can be used for valve cover 2, however, as long as such insulating material is substantially rigid.

Main body section 30 of valve body 2 includes a cylindrical body or housing 36 which extends over approximately three quarters of the circumference of either of the flanges 8 or 10. In fact, the diameter 40 of cylindrical section 36 is selected to be slightly larger than the diameter of either the flanges 8 or 10. This allows main body section 30 to be placed over the flanges 8 and 10 in the manner indicated in FIG. 1. In addition, in order to accommodate the enlarged head 16, main body section 36 includes a cylindrical cap 42 fixedly secured to cylindrical section 36 intermediate the ends thereof. Cap 42 defines a hollow upwardly extending chamber into which upper head 16 extends. Cap 42 is oriented at right angles to the cylindrical body 36.

Each of the lower body sections 32 and 34 are generally identical and comprise an arcuate section of insulating material which extends over the remaining one quarter of the circumference of flanges 8 and 10. Each body section 32 and 34 has inner and outer ends 44 and 46. The outer ends of the body sections will be located respectively on top of one of the flanges 8 and 10 and the inner ends of the sections will abut together along the center of valve cover 2. In addition, each section 32 and 34 includes an arcuate recess generally denoted at 50. Arcuate recess 50 forms one quarter of a circular opening, generally identified as 52, which will be formed when all three sections 30, 32 and 34 of valve body 2 are assembled together. Circular opening 52 is sized to receive the stem 22 of lower head 18 such that the flange 20 of lower head 18 will be located outside valve cover 2. This is necessary since the moisture sensing controls in lower head 18 will be exposed to the environment. Circular opening 52 is sized to closely surround stem 22. In addition, each of the lower body sections 32 and 34 comprises a cut-out 47 located along one of the edges of the body sections 32 and 34 which abut against the body section 30. These cut-outs 47 allow the control lines 24 and 26 to extend outwardly therethrough and are shaped to closely fit around the control lines 24 and 26.

Means are provided for releasably securing the parts of valve cover 2 together. The releasable securing means is generally referred to as 60 and comprises two circumferentially extending straps or bands 62. Each strap or band 62 encircles main body section 30 and one of the lower body sections 32 and 34 adjacent each end of valve cover 2. Any means of tightening strap 62 could be used including a buckle type strap or any other conventional arrangement. One preferred means for tightening the strap is simply to use a buckle 66 to which one end 67 of strap 62 is fixedly attached. The other or free end 68 of strap 62 can then pass through the other side of buckle 66 and be bent back along the strap 62 after the strap has been tightened.

Use of the Valve Cover

Valve cover 2 has numerous advantages. For example, valve cover 2 may be prefabricated for a given type and size of valve. When it is then desired to install the valve cover on such a valve, the ultimate user, who in this case will be the owner of the pipe line system, will simply order an appropriate size valve cover. One of the user's own employees can then easily install valve cover 2 by hanging the main body section 30 onto the main body of the valve, by putting the encircling straps 62 loosely into place, by then fitting in the remaining lower body sections 32 and 34 inside the loosely retained strap, and then by tightening the strap as necessary to hold valve cover 2 in place. Because valve 2 is made from a plurality of rigid parts especially designed to fit the particular valve 4, one employee can easily install valve cover 2 in a minimum amount of time. Thus, the labor costs required for such an installation are considerably reduced.

In addition, because of the easily removable straps 62, valve cover 2 can be easily disassembled if for any reason valve 4 should need to be repaired. Again, one person can both disassemble valve cover 2 and then replace valve cover 2 after repair of the valve has been effected. This is a considerable improvement over the prior art systems of completely encasing the valve inside a rigid type of insulation in which the entire insulation would have to be stripped in order to reach the valve.

One preferred type of valve cover 2 has been disclosed herein, the actual form of valve cover 2 may vary depending on the actual configuration of the valve. For one thing, the two lower left and right body sections 32 and 34 could be formed as one auxiliary body piece if so desired. However, the formation of these sections as separate sections facilitates the case with which valve cover 2 may be assembled since it is somewhat easier to place the two sections inside the loosely retained straps 62.

It is contemplated that a flexible fiberglass packing material, in a blanket or batt form, will also accompany valve cover 2. This packing material is generally identified as 70 and can be used to fill any gaps occurring between valve cover 2 and valve 4 or the sections of the pipe line immediately adjacent valve 4. For example, such packing material 70 can line the circular opening 52 to ensure a tight fit with valve stem 22. Moreover, packing material 70 can also be placed between each end of main body section 30 and any existing insulation located around the adjacent sections of pipe line to fill any gaps occurring there. In addition, the insulating material which is used to make up valve cover 2 can comprise any suitable insulating materials, whether those insulating materials are fiberglass or not, as long as such materials are substantially rigid. Other possible materials which can be used to make up valve cover 2 can be Kaylo 10 Asbestos Free Pipe Insulation or Johns-Manville Micro-Lok 850 Pipe Insulation. Various other modifications of this invention will be apparent to those skilled in the art. Thus, the scope of this invention is to be limited only by the appended claims.

What is claimed is:

1. An insulated valve cover for insulating a spence valve interposed in a fluid line which valve has a lower head housing ambient condition sensors and an upper head, which heads have an axis extending generally transverse to the axis, and on opposite sides of, a valve body, said axis extending in a direction in which fluids conducted through the line flow, comprising:

a substantially rigid main section, elongated in the direction of fluid flow and formed arcuately with respect to the axis of the valve body, said main section including an integral cap portion including an axis extending generally radially with respect to the axis of the valve body to enclose the upper head of the valve, and including a first arcuate edge circumferentially opposite said cap portion, and a second arcuate edge spaced from said first arcuate edge, and a substantially rigid auxiliary section elongated in the direction of fluid flow and formed arcuately with respect to the axis of the valve body, said auxiliary section having a first arcuate edge and being removably disposed relative to said main section said auxiliary section further including a second arcuate edge, said auxiliary section respectively abutting said first and second respective arcuate edges of said main section to circumferentially enclose the valve body, whereby said main section will remain suspended from said valve by said cap while said auxiliary section is positioned to complete said cover.

2. An insulated valve cover as recited in claim 1, further comprising means for releasably holding the main and auxiliary sections together to allow removal of the valve cover when the valve is to be repaired.

3. An insulated valve cover as recited in claim 2, wherein the releasable holding means comprises at least one elongated tension member which circumferentially surrounds the main and auxiliary sections, and further including means for tightening the tension member in a circumferential direction to compress the main and auxiliary sections and hold them on the valve.

4. An insulated valve cover as recited in claim 1, wherein the main and auxiliary sections are each provided with arcuate cut-outs formed opposite one another in said first arcuate edges, which cut-outs collectively form a circular opening through which a portion of the lower head extends so that the lower head is exposed to the atmosphere.

5. An insulated valve cover as recited in claim 4, wherein the auxiliary section comprises left and right sections each of which are approximately one half as long as the main section, and wherein a portion of said circular opening is formed in each of said left and right sections.

6. An insulated valve cover as recited in claim 4 or 3, wherein the main and auxiliary sections are made from a high density fiberglass insulating material having an outer jacket.

7. An insulated valve cover as recited in claim 6, wherein the outer jacket is canvas.

* * * * *

UNITED STATES PATENT AND TRADEMARK OFFICE
CERTIFICATE OF CORRECTION

PATENT NO. : 4,259,981
DATED : April 7, 1981
INVENTOR(S) : Richard O. Busse

It is certified that error appears in the above-identified patent and that said Letters Patent are hereby corrected as shown below:

In Column 6, line 13, after "axis" read--of said valve body--.

Signed and Sealed this

Fourth Day of August 1981

[SEAL]

Attest:

GERALD J. MOSSINGHOFF

Attesting Officer

Commissioner of Patents and Trademarks